United States Patent [19]

Ermert

[11] Patent Number: 4,787,948

[45] Date of Patent: Nov. 29, 1988

[54] PROCESS FOR THE PRODUCTION OF ELASTIC TAPES FROM POLYURETHANE

[75] Inventor: Wolfgang Ermert, Fallingbostel, Fed. Rep. of Germany

[73] Assignee: Wolff Walsrode Aktiengesellschaft, Walsrode, Fed. Rep. of Germany

[21] Appl. No.: 68,077

[22] Filed: Jun. 29, 1987

[30] Foreign Application Priority Data

Jul. 18, 1986 [DE] Fed. Rep. of Germany ....... 3624303

[51] Int. Cl.⁴ ............................................. B32B 31/08
[52] U.S. Cl. ...................................... 156/164; 156/85; 156/229; 264/146; 264/289.3; 264/342 R; 264/348
[58] Field of Search ................. 156/163, 164, 85, 229, 156/84, 160; 264/288.4, 289.3, 210.1, 342 R, 289.6, 342 RE, 230, 232, 235, 346, 146, 348; 428/910

[56] References Cited

U.S. PATENT DOCUMENTS

| | | | |
|---|---|---|---|
| 3,324,217 | 6/1967 | Armstrong et al. | 264/289.3 |
| 4,645,135 | 2/1987 | Morris et al. | 242/67.1 R |
| 4,648,928 | 3/1987 | Ales | 156/164 |

*Primary Examiner*—Michael W. Ball
*Assistant Examiner*—David Herb
*Attorney, Agent, or Firm*—Sprung Horn Kramer & Woods

[57] ABSTRACT

Process for the production of elastic tapes from thermoplastic polyurethane elastomers, wherein the thermoplastic is extruded to form a flat or tubular film and is slit in the usual manner, the extruded film being oriented lengthwise at least in the ratio of 1:1.5, cooled and stored until the modulus of elasticity has increased by at least 25%, measured according to DIN 53,455, before the film is slit, and the use of these tapes for the production of elastic seals.

4 Claims, No Drawings

PROCESS FOR THE PRODUCTION OF ELASTIC TAPES FROM POLYURETHANE

The present invention relates to processes for the production of elastic tapes from polyurethanes, wherein thermoplastic polyurethane elastomers are extruded to form films, stretched lengthwise and stored, before slitting, until the modulus of elasticity has increased by at least 25%, measured according to DIN 53,455, and to the use of these tapes for the production of elastic seals.

It is already known (U.S. Pat. No. 4,300,967) to use elastic tapes of polyurethanes for the production of elastic seals, for example elastic leg seals on diaper pants. In this application, difficulties kept recurring, since the stretched polyurethane tapes, upon contact with the hot melt adhesive, are as a rule exposed to temperatures of 120° to 130° C. and thereby lose their elasticity, i.e. at elevated temperatures the tapes lose their power of recovery and remain permanently elongated to the extent that they have been stretched. This thermal damage is the greater, the thinner and narrower the polyurethane tapes employed. Attempts to overcome this harmful effect of temperature by applying the hot melt adhesive only in the edge zones of the polyurethane tapes and/or only very thinly has moderate success in the case of relatively broad tapes but none whatsoever in the case of tapes of widths <10 mm.

Using the process according to the invention, it is now possible to provide polyurethane tapes which do not exhibit these disadvantages and which are therefore particularly suitable for elastic seals.

One subject of the present invention is therefore processes for the production of elastic tapes from thermoplastic polyurethane elastomers wherein the thermoplastic is extruded to form a flat or tubular film which is slit in the usual manner, the processes being characterized in that the extruded film is oriented lengthwise in the ratio of at least 1:1.5, preferably 1:3, cooled and stored until the modulus of elasticity is increased by at least 25%, preferably by 40–75%, measured according to DIN 53,455, before the film is slit.

A further subject of the present invention is processes for the production of elastic seals with the aid of the thermoplastic tapes produced according to the invention, the processes being characterized in that the tapes are attached, in the stretched state, to the substrate, preferably a polyethylene web of the diaper pants, by means of hot melt adhesives and are reexposed, in the stress-released state, to a heat treatment.

After this heat treatment of the stress-released polyurethane tape which is bonded to the substrate it is found that it again exhibits the power of recovery which was still present before bonding to the substrate and that it reverts to its original length, as a result of which the substrate becomes uniformly crimped, i.e. an elastic seal is formed. This uniform crimping has the further advantage that the elastic seal provides better leak-tightness and is therefore in particular suitable as a leg seal for diaper pants.

Polyurethanes having a melt index of <100, preferably in the range from 20 to 30 g per 10 minutes (tested at 8.7 kg/190° C.) are preferentially suitable for the production of the polyurethane tapes. Among these polyurethanes, thermoplastic polyurethane elastomers of which the diol component is derived from polyester or polyether, preferably from polyethers, and which have a Shore A hardness in the range from 65 to 90 are especially suitable. Such thermoplastic polyurethane elastomers are known commercially available products.

The production of the polyurethane films from which the polyurethane tapes are subsequently produced can be effected by extrusion to give a flat film or a tubular film, the film blowing process being preferred. In the process of production the film web, after leaving the extrusion die, is oriented lengthwise, at least in the ratio of 1:1.5, and preferably in the ratio of 1:3, by high take-off forces, is cooled rapidly, preferably with refrigeration air, and is wound up in the conventional manner. Winding up should be effected with a high winding tension, preferably the same tensile forces as during the lengthwise orientation. The film is stored in this state until the modulus of elasticity measured according to DIN 53,455 has increased by at least 25%, preferably by 40–75%. The films are then slit in a known manner, if still necessary, into tape widths, preferably widths of 1 to 10 mm, preferably 3 to 7 mm. The films should, for the production of elastic seals, have a thickness of 20 to 80μ, preferably 30 to 40μ.

Before they are applied to the substrate, preferably a plastic web, such as a polyethylene web for diaper pants, the polyurethane tapes produced as above are stretched by at least 50%, preferably by at least 100%, of their unstretched length and are bonded by means of hot melt adhesives, preferably intermittently, to the substrate. In the course thereof the polyurethane tape, due to contact with the hot melt adhesive, i.e. due to the action of heat, to a large extent loses its power of recovery and remains, even in the stress-released state, in the lengthened condition achieved by the stretching. Only when the cooled polyurethane tape is again subjected to heat is it possible, depending on the heat exposure, not only to achieve the original unstretched length but, if desired, even a reduction in this length. For each polyurethane material, this length-temperature relationship can be ascertained by simple measurement, so that it is possible to read from a diagram what heat exposure is supposed to achieve a desired recovery and hence a desired length of the polyurethane tape for a particular elastic seal.

At the same time it is found, surprisingly, that only the polyurethane films or tapes produced according to the invention exhibit this effect, while conventionally produced tapes, the base film material of which has not passed through the process steps according to the invention, regain their power of recovery to a far lesser extent upon appropriate heat treatment in the lengthened state, and remain in the lengthened state.

EXAMPLE (a) A polyester-polyurethane film having a melt index of 25 to 28 g/10 min. (tested at 8.7 kg/190° C.) is produced, by the film blowing process, in a thickness of 40 μ, a take-off ratio of 1:3 in the lengthwise direction, rapid supply of refrigeration air and maximum possible winding tension being maintained. After a storage of about 48 hours, during which the modulus of elasticity rises from its initial value of 4.5 N/mm$^2$ to 7.5 N/mm$^2$ measured according to DIN 53,455, the film is slit to a width of 6 mm.

(b) The polyurethane tapes produced under A and stretched by 100% are bonded to a polyethylene web by means of a hot melt adhesive which has beforehand been applied in two traces to the tape. After cooling, the tape which is stress-released and fixed to the substrate is subjected to a fresh heat treatment. Depending on whether the fresh heat treatment is carried out at 60° C., 90° C. or 100° C., the stretched polyurethane tape reverts to within 18% or 12% or 5%, respectively, of the original length. This means that the renewed heat treatment can achieve a recovery of 82, 88 or 95%, respectively, while a tape which has been applied in a 100% stretched state to the polyurethane substrate and has not been subjected to a renewed heat treatment exhibits an increase of 80% in original length, that is to say a recovery of only 20% occurs upon cooling and stress release.

I claim:

1. In the production of elastic tapes by extruding a thermoplastic polyurethane elastomer to form a flat or tubular film, orienting the film and slitting the film into tapes, the improvement which comprises orienting the extruded film lengthwise with a take-off ratio of at least 1:1.5, cooling the film and storing it under tension until the modulus of elasticity, according to DIN 53,455, has increased by at least 25% prior to slitting, including the additional steps of stretching the tape, bonding the stretched tape to a substrate with a hot melt adhesive, cooling and releasing the stress, and subjecting the substrate-tape structure to a further heat treatment to shrink said tape.

2. The process according to claim 1, wherein the polyurethane elastomer is a polyurethane-polymer elastomer.

3. The process according to claim 1, wherein the extruded material forms a tubular film which is wound and stored under high winding tension.

4. The process according to claim 1, wherein the further heat treatment is carried out at a temperature of at least 60° C.

* * * * *

UNITED STATES PATENT AND TRADEMARK OFFICE
CERTIFICATE OF CORRECTION

PATENT NO. : 4,787,948
DATED : November 29, 1988
INVENTOR(S) : Wolfgang Ermet

It is certified that error appears in the above-identified patent and that said Letters Patent is hereby corrected as shown below:

Col. 4, line 9    Delete "-polymer" and substitute -- -polyether --

Signed and Sealed this

Twelfth Day of September, 1989

Attest:

DONALD J. QUIGG

Attesting Officer    Commissioner of Patents and Trademarks